United States Patent [19]

Carder et al.

[11] Patent Number: 5,247,710
[45] Date of Patent: Sep. 28, 1993

[54] RESERVOIR LEVEL CONTROL SYSTEM

[76] Inventors: Jan Carder, 4970-A Jackson St., North Highlands, Calif. 95660; Donald Smith, 5823 Alameda Ave., Apt. A, Richmond, Calif. 94804; Richard Jones, 6135 Viceroy, Citrus Heights, Calif. 95610

[21] Appl. No.: 868,081

[22] Filed: Apr. 9, 1992

[51] Int. Cl.⁵ .................... E04H 3/16; E04H 3/18
[52] U.S. Cl. .................................. 4/508; 4/496; 137/392; 137/563; 307/118
[58] Field of Search ............... 4/508, 496; 73/304 R; 137/392

[56] References Cited

U.S. PATENT DOCUMENTS

| | | |
|---|---|---|
| 3,759,286 | 9/1973 | Page . |
| 3,997,925 | 12/1976 | Hough . |
| 4,014,052 | 3/1977 | Wolos . |
| 4,133,059 | 1/1979 | Baker . |
| 4,203,325 | 5/1980 | Cowles et al. ............ 73/304 R |
| 4,380,091 | 4/1983 | Lively . |
| 4,600,844 | 7/1986 | Atkins ....................... 340/620 X |
| 4,607,658 | 8/1986 | Fraser ........................ 4/508 X |
| 4,612,949 | 9/1986 | Henson . |
| 4,685,158 | 8/1987 | Lively . |
| 4,817,217 | 4/1989 | Lively . |
| 4,879,902 | 11/1989 | Loniello .................... 137/392 X |

*Primary Examiner*—Daniel M. Yasich
*Attorney, Agent, or Firm*—James M. Ritchey

[57] ABSTRACT

An automatic sensor system for detecting and adjusting a level of contents held within a reservoir is disclosed. The system has a sensor probe having a probe housing with opposing ends, an interior cavity that opens through one housing end, and a constantly open air vent aperture piercing the housing proximate the other housing end, included within the housing are lower and upper level detection contacts that communicate information about the detected level to a circuit that signals for a contents delivery source to send additional contents when needed.

2 Claims, 4 Drawing Sheets

RESERVOIR LEVEL CONTROL SYSTEM

BACKGROUND OF THE INVENTION

1. Field of the Invention

The subject invention relates to a device for preventing the overflow of a container being filled with a substance. More particularly, the subject invention is a sensor and associated circuit for regulating the fill level in a swimming pool or similar container.

2. Description of the Background Art

Several types of electronic and pressure monitors exist to regulate the level to which a container is filled with a particular substance. Many of these prior mechanisms have involved expensive and needlessly complex fabrications. The subject device has a uncomplicated sensor with a reliable control circuit which are relatively inexpensive to produce.

Specifically, disclosed in U.S. Pat. No. 3,759,286 is an apparatus for maintaining the water level within a swimming pool to a predetermined set of limits. A small ball floats within a sensor cylinder. As the water level fills the cylinder electrodes detect the height. The ball prevents overflow during activation of the pump. Since the pump is in immediate fluid linkage with the sensor, a running pump limits the usefulness of the sensor.

Related in U.S. Pat. No. 3,997,925 is another apparatus to control the water level in a swimming pool. In a stilling chamber, to quiet wave action, water enters a perforated column that contains two level detecting electrodes and a ground electrode. The water is maintained at predetermined heights. A water release system very similar to a traditional lever arm toilet fill system is incorporated into one embodiment of the device.

A pressure activated liquid level control apparatus is described in U.S. Pat. No. 4,014,052. The device is positioned over the edge of a tank to permit the device's housing to be in and out of the tank. Several passageway are interactively connected to regulate the liquid level within the tank.

U.S. Pat. No. 4,133,059 presents an automated surge weir and rim skimming gutter flow control system for use with a swimming pool. A plurality of electrode gutter sensors helps adjust the level to a desired position. Connected to the chamber that holds the gutter sensors is a complex surge weir to damp wave action.

Control circuitry for water level control within a pool is disclosed in U.S. Pat. No. 4,380,091. A multi-level detecting sensor is coupled to a sophisticated controlling circuit having internal oscillators.

Furnished in U.S. Pat. No. 4,612,949 is an apparatus for controlling the liquid level in a fluid reservoir. The sensor is either used within a conventional pool skimmer or secured to the wall of the reservoir. A perforated cylinder with a threaded central electrode serves as the basic probe construction. Found in the circuit electronics are logic blocks for determining the level of the liquid and ones intended to compensate for the action of waves.

Finally, U.S. Pat. Nos. 4,685,158 and 4,817,217 relate a swimming pool control system for adjusting water level. A sophisticated electronic circuit having an internal clock is employed in the system. Additionally, four electrodes are fitted within a sensor housing with one above the normal fill level, one below the normal fill level, and two located side-by-side and well below the position of either of the other two electrodes. This electrode configuration, coupled with the associated circuit, is used to limit the fill level.

SUMMARY OF THE INVENTION

An object of the present invention is to produce a sensor probe for measuring the level of contents within a reservoir that is resistant to wave action of the contents.

Another object of the present invention is disclose an automatic sensor system for adjusting a level of contents held within a reservoir.

A further object of the present invention is to provide a circuit for activating and terminating the delivery of contents into a reservoir.

The subject invention comprises an automatic sensor system for detecting and adjusting a level of contents held within a reservoir. Included is a sensor probe comprising a probe housing having the first and second ends with an interior cavity that opens through the first housing end. Proximate the second housing end is a constantly open air vent aperture piercing the housing. Within the cavity are first means for detecting a lower level of the contents and second means for detecting an upper level of the contents. In an associated circuit is a processing means for determining the lower and upper levels of the contents. Additional contents are delivered to the reservoir when the first means for detecting the lower contents level is not in contact with the contents. Contents delivery is terminated when both the first means for detecting the lower contents level and the second means for detecting the upper contents level are in contact with the contents.

Other objects, advantages, and novel features of the present invention will become apparent from the detailed description that follows, when considered in conjunction with the associated drawings.

DESCRIPTION OF THE PREFERRED EMBODIMENT

Referring now to FIGS. 1-4, there is shown a preferred embodiment of a substance, contents within a reservoir R, level control apparatus. Although the preferred substance is a liquid, usually water W, a flowing solid such as grain, sand, and equivalent materials are contemplated. The reservoir W is any type of container, including a toilet, silo, water storage tank, and the like, usually it is a swimming or wading pool.

Figure 1:
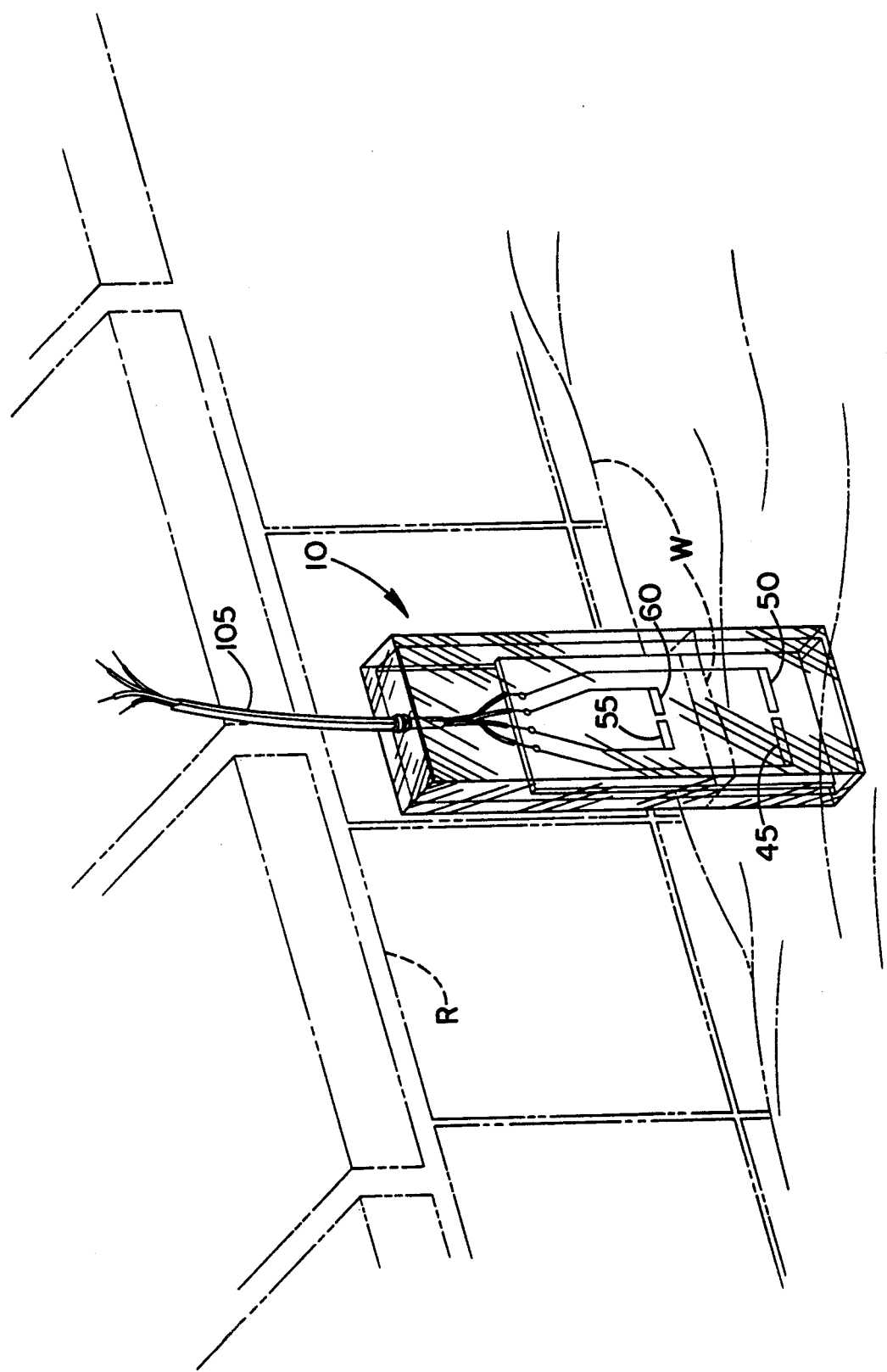
FIG. 1 is a perspective view of the subject probe affixed to a side of a liquid reservoir.

Comprising the subject apparatus is a sensor probe 10 and a controlling electrical circuit. For illustrative purposes only, the reservoir will be specifically a swimming pool R and the contents water W (see FIG. 1). The probe 10 is secured either within the pool R or in a separate chamber connected to and reflecting the level of the water W within the pool R. As seen in FIG. 1, the probe 10 is anchored, by appropriate attachment means such as gluing, screwing, and similar techniques, to a wall of the pool R.

Figure 2:
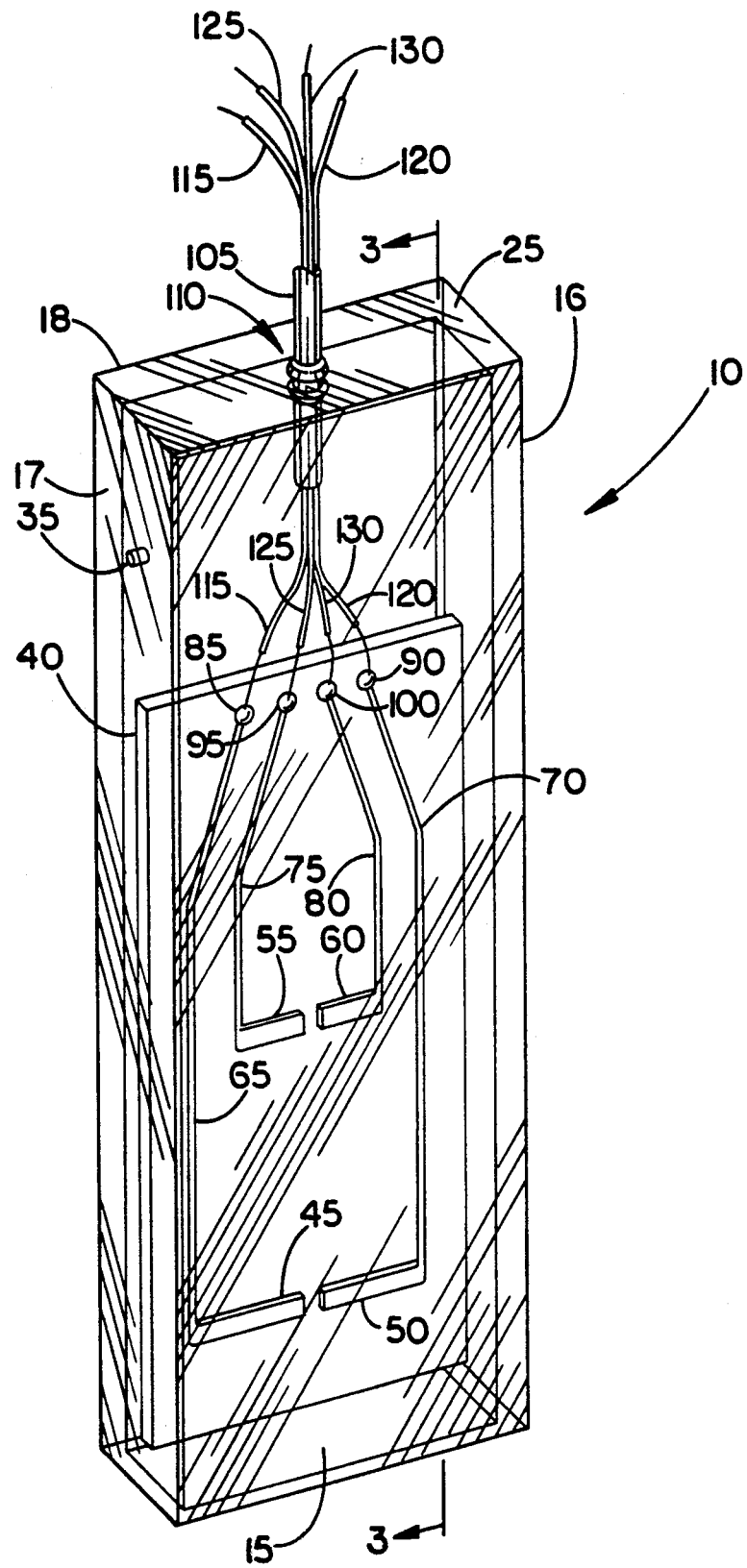
FIG. 2 is a perspective view of the subject probe.
Figure 3:
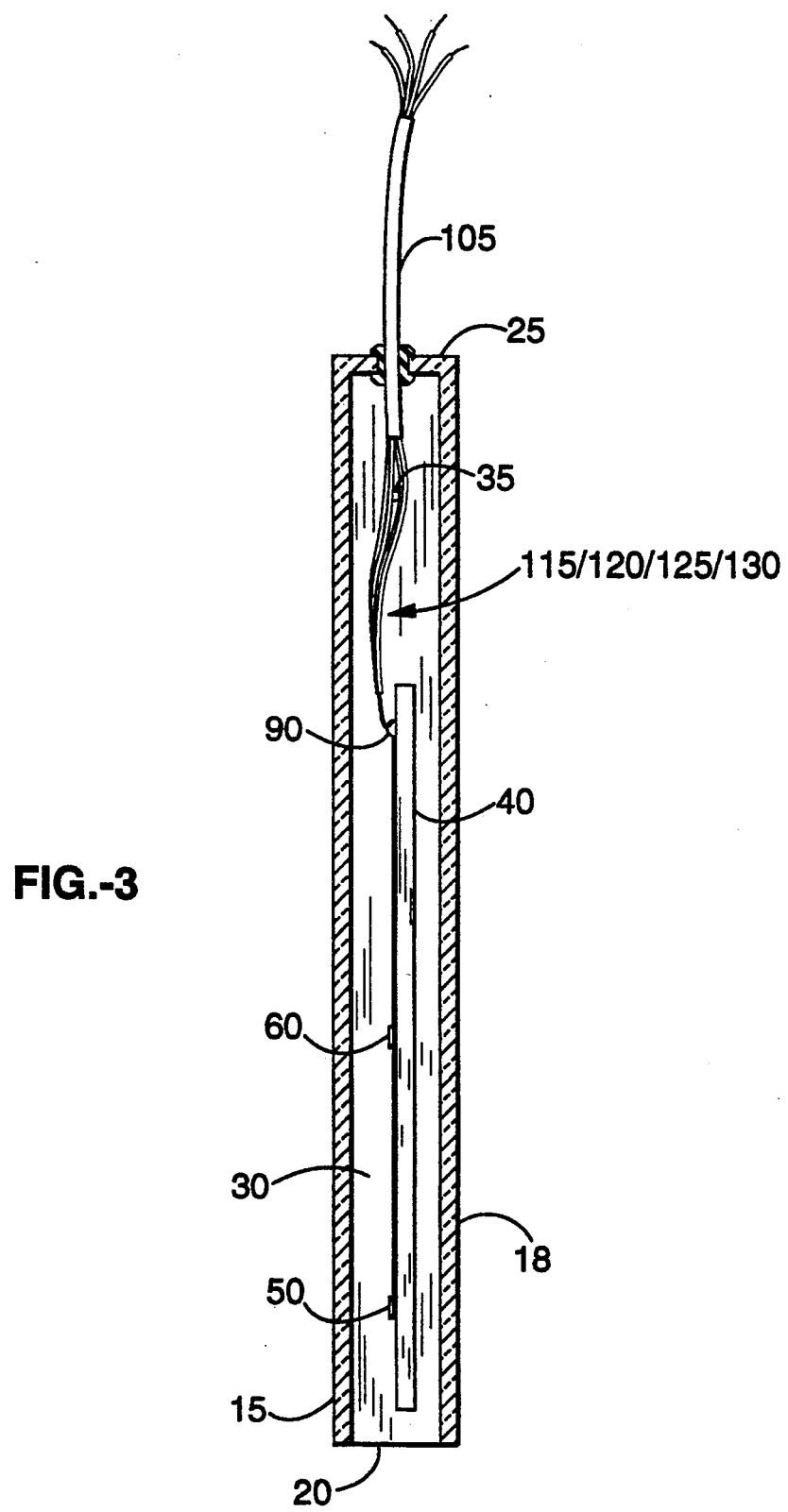
FIG. 3 is a cross sectional view of the subject probe taken along line 3—3 in FIG. 2.

As depicted in FIGS. 1-3, the probe 10 is constructed of a housing having perimeter walls 15, 16, 17, and 18, a first open end 20, and a second water tight end 25. Within the probe housing is an interior cavity 30 that opens through the first housing end 20. Although the illustrated probe is an elongated rectangular box, other equivalent configurations are suitable.

The probe 10 is oriented in the pool R with the first open end 20 towards the bottom of the pool R. In one of the perimeter walls 17 is formed a small, constantly open, vent aperture 35. As water enters the probe cavity 30, air trapped within the probe escapes via the aperture 35. The size of the aperture 35 is selected to dampen or buffer wave action within the pool R by gradually venting air, thereby admitting and draining water at a rate slower than the wave motion. Except for the housing first end 20 and the vent aperture 35 the probe 10 is generally water tight.

Secured within the housing cavity 30 is a contact mounting panel or sheet 40. Preferably, the panel 40 is a separate member fitted within the cavity 30, however, any inside surface of a perimeter wall 15-18 may serve a similar contact mounting role. Securement of the panel 40 to the perimeter walls 15-18 is by standard procedures like gluing, integral formation with the side walls 15-18, and equivalent means.

Fastened to the panel 40, and exposed to the water W, are first lower water level detection means comprising a pair of first electrical contact members 45 and 50. Further, affixed to the panel 40, and exposed to the water W, are second upper water level detection means comprising a pair of second electrical contact members 55 and 60. Any electrically conducting material that has a relative resistance to decomposition in water W is suitable for the contact members 45, 50, 55, and 60.

Electrically coupled to each contact member 45, 50, 55, and 60 are conductors 65, 70, 75, and 80, respectively. Each conductor 65, 70, 75, and 80 extend to a terminal 85, 90, 95, and 100, respectively.

A cable 105 enters the probe 10, usually via a water tight housing entrance 110 in or proximate the probe's second end 25. Encased in the cable 105 are wires 115, 120, 125, and 130 that lead between the controlling electrical circuit of the subject device and the probe terminals 85, 90, 95, and 100, respectively.

Figure 4:
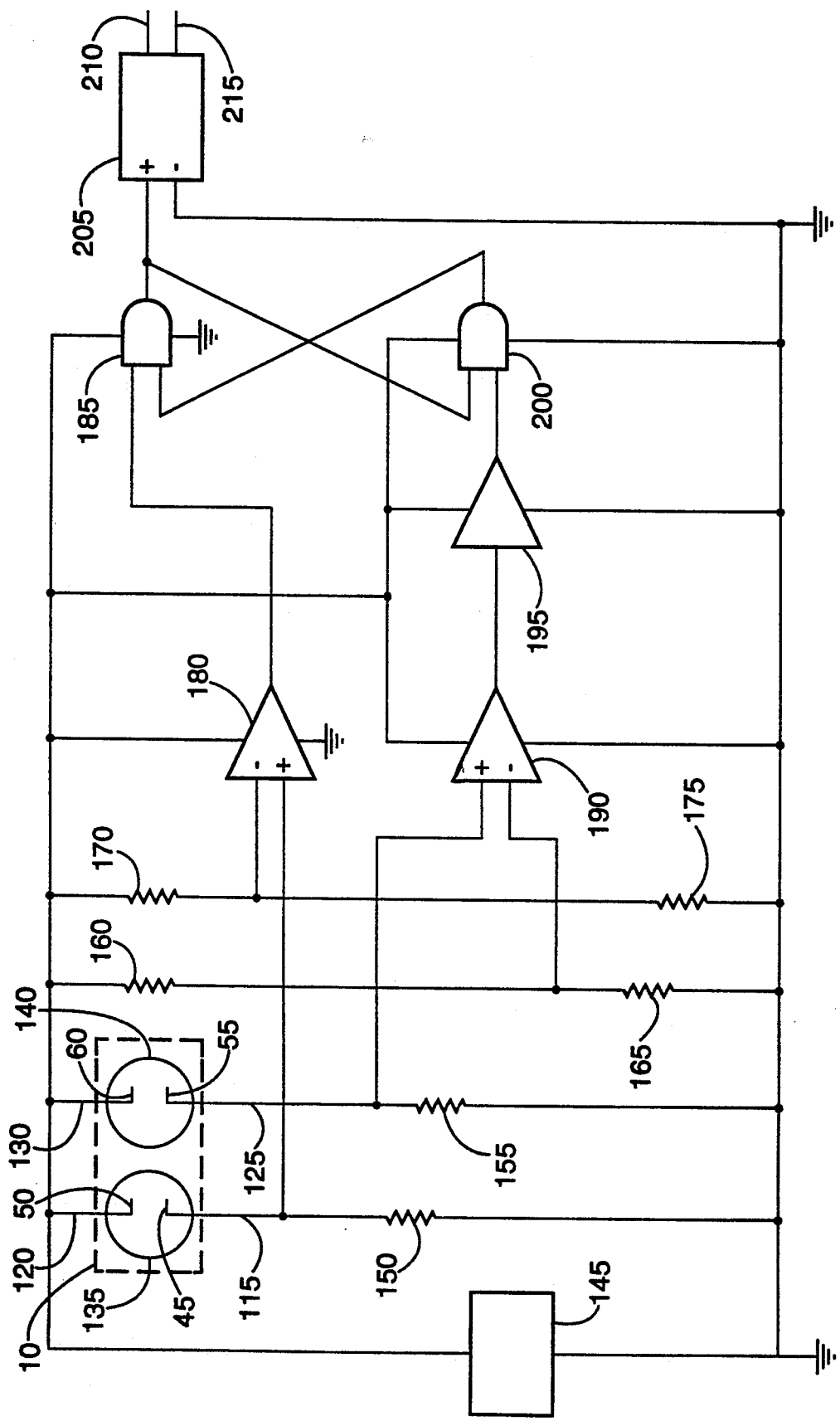
FIG. 4 is a circuit diagram for the control module of the subject apparatus.

Referring now to FIG. 4 for the subject controlling circuit schematic diagram, the dashed line box denotes the probe 10. The first pair of electrical contact members 45 and 50 are within circle 135 and the second pair of electrical contact members 55 and 60 are within circle 140. The sensor probe 10 is electrically coupled, as indicated in FIG. 4, into the controlling circuit via the wires 115, 120, 125, and 130.

The control circuit functions to process the information detected by the lower level 135 and upper level 140 water W electrical contact member pairs. It is noted that the subject probe may be used with other equivalent electrical control circuits, but the following circuit is preferred. Additional water W is delivered to the swimming pool R when the first pair of contacts 135 is not covered or not in contact with the water W. Water W delivery is terminated when both the first pair of contacts 135 for detecting the lower water W level and the second pair of contacts 140 for detecting the upper water W level are covered or in contact with the water W.

Power supplied to the subject circuit by a standard power supply 145. Usually, the power supply 145 is a D.C. source for 5 volts, but other equivalent voltages are contemplated to be within the realm of this disclosure. Commonly available resistors 150 and 155 typically have about 10 M ohm resistance at about 0.5 to 1 watt and resistors 160, 165, 170, and 175 have about 1 k ohm resistance at about 0.25 to 0.5 watt.

A quad comparator 180 (model number LM339N from National Semiconductors and also available from Signetics, Texas Instruments, and like suppliers) is positioned in the control circuit to deliver a signal to a quad nand gate 185 (model number N7400 from Signetics and also available from National Semiconductors, Texas Instruments, and like suppliers). A second quad comparator 190 is coupled to a hex inverter 195 (model number N7404 from Signetics and also available from National Semiconductors, Texas Instruments, and like suppliers), which feeds to a second quad nand gate 200 (usually, both quad comparators 180 and 190 are from the same integrated circuit chip and both nand gates 185 and 200 are from the same integrated circuit chip).

Water delivery is actuated or terminated by means of a solid state relay 205 (model number RSSD-10 A, available from IDEC Corporation, 1213 Elko Drive, Sunnyvale, Calif. 94089 and like suppliers) coupled to a common electrically controlled water flow valve. First 210 and second 215 conductors lead to the water flow valve to actuate water deliver.

In general terms the subject apparatus functions in the following manner. The sensor contacts function as part of a voltage dividing network that uses the resistivity of water in combination with resistors to present high or low voltage levels to a pair of comparators, which is turn, drive a R-S flip-flop configuration of nand gates.

Basically, there are three states. The first state is the no-water condition. In this no-water condition both contact pairs 135 and 140 are not exposed to water. At this point the resistivity is equal to air between contacts 45 and 50 and contacts 55 and 60. Since the air gap across contacts 45 and 50 results in a large drop in voltage, only a very small voltage is left between these contacts and the resistor 150. The same low voltage is present between the contact pair 140 and resistor 155.

The low voltages present between the contact pair 135 and resistor 150 and contact pair 140 and resistor 155 are present at comparators 180 and 190, respectively. Both of these low voltages result in a low voltage on the outputs of the comparators. The output of comparator 180 is present at the set input of nand gate 185. The output of comparator 190 is changed to a high by inverter 195 which is present at the reset input of nand gate 200. This results in a high on the Q output of the R-S flip-flop configuration of the nand gates which turns on the solid state relay 205. While the Q output of the flip-flop is high, the solid state relay 205 acts like a closed switch allowing approximately 24 to 330 volts ac to flow between contacts 210 and 215. When appropriate, this voltage is used to open an electrically operated valve that releases water W into the pool R until the output of nand gate 185 changes to a low.

While the output of nand gate 185 is high, water W will continue to rise in the pool R. When the water W level is high enough to come between contact pair 45 and 50, the resistance between the two contacts is less than it was when no water was present. The resistance of the water W and the resistor 150 act like a voltage divider presenting a higher voltage between contact pair 135 and resistor 150 than is present at comparator 180, but results in a no change condition on the Q output of the flip-flop. This no change o "hold" condition continues until water reaches contact pair 140, which results in a second, or high water W state.

The second state is caused when the water W is present between contacts 55 and 60. At this point, the water W offers less resistance than air and results in higher voltages between contact pair 140 and resistor 155. The resulting voltage between contact pair 140 and resistor 155 is higher than what is provided by the voltage divider consisting of resistors 160 and 165, resulting in a voltage high out of comparator 190. This voltage high is changed to a low by inverter 195, which in turn presents a low input to the reset input of the flip-flop causing a Q output to go low. The low on the Q output turns off the solid state relay so that it no longer acts like a closed switch between contacts 210 and 215. Without continuity between contacts 210 and 215 the electrically operated valve is closed and the water W ceases to rise in the pool R.

The third state, or the restart state, occurs when the water falls, due to evaporation or other equivalent reasons, until only air comes between contacts 45 and 50. The high resistance between contacts 45 and 50 acts like a voltage divider with resistor 150 to produce a low voltage at the positive input of comparator 180 resulting in a low input to the set input on nand gate 185. At this point, the cycle is repeated with a high voltage out of Q, which turns on the solid state relay 205 causing continuity between contacts 210 and 215 so that the electrically operated valve is once again open allowing water to fill the pool R.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. An automatic sensor system for detecting and adjusting a level of contents held within a reservoir, comprising:
   a) a sensor probe comprising:
      a probe housing having first and second ends with an interior cavity that opens through said first housing end and a constantly open air vent aperture piercing said housing proximate said second housing end;
      first means for detecting a lower level of said contents, wherein said first detection means comprises a pair of first electrical contact members within said cavity and positioned proximate said first housing end;
      a pair of first conductors electrically coupled to said pair of first electrical contact members, wherein said pair of first conductors is anchored to said probe housing proximate said housing second end;
      second means for detecting an upper level of said contents, wherein said second detection means comprises a pair of second electrical contact members within said cavity and positioned between said pair of first electrical contact members and said vent aperture;
      a pair of second conductors electrically coupled to said pair of second electrical contact members, wherein said pair of second conductors is anchored to said probe housing proximate said housing second end; and
   b) means for processing said lower level and upper level contents detection, whereby additional contents are delivered to said reservoir when said first means for detecting said lower contents level is not in contact with said contents and said contents delivery is terminated when both said first means for detecting said lower contents level and said second means for detecting said upper contents level are in contact with said contents.

2. An automatic sensor system for detecting and adjusting a level of water held within a swimming pool, comprising:
   a) a sensor probe comprising:
      a probe housing having first and second ends with an interior cavity that opens through said first housing end and a constantly open air vent aperture piercing said housing proximate said second housing end;
      first means for detecting a lower level of said water, wherein said first detection means comprises a pair of first electrical contact members within said cavity and positioned proximate said first housing end;
      a pair of first conductors electrically coupled to said pair of first electrical contact members, wherein said pair of first conductors is anchored to said probe housing proximate said housing second end;
      second means for detecting an upper level of said water, wherein said second detection means comprises a pair of second electrical contact members within said cavity and positioned between said pair of first electrical contact members and said vent aperture
      a pair of second conductors electrically coupled to said pair of second electrical contact members, wherein said pair of second conductors is anchored to said probe housing proximate said housing second end; and
   b) means for processing said lower level and upper level water detection, whereby additional water is delivered to said pool when said first means for detecting said lower water level is not in contact with said water and said water delivery is terminated when both said first means for detecting said lower water level and said second means for detecting said upper water level are in contact with said water.

* * * * *